Jan. 4, 1927.

C. H. PAYNE 1,613,358

RECEPTACLE FOR PASTE OR MUCILAGE

Filed Dec. 14, 1925

INVENTOR.
Charles H. Payne
By John W. Strother
ATTORNEY.

Patented Jan. 4, 1927.

1,613,358

UNITED STATES PATENT OFFICE.

CHARLES H. PAYNE, OF CINCINNATI, OHIO.

RECEPTACLE FOR PASTE OR MUCILAGE.

Application filed December 14, 1925. Serial No. 75,464.

My invention relates more particularly to jars for holding mucilage, paste, or any kind of a plastic material of a kindred nature. It is very simple in construction, and is highly efficient in use, and one of the main objects of my invention is to keep the contents and the container in a highly sanitary condition, to keep the paste or mucilage in a live, normal condition, even to the last of the contents, this preventing the contents from caking, crumbling and getting crusty and hard. The container is so constructed in connection with a removable gasket, of special material and construction so as to keep out the air, thus cutting the tendency of the mucilage or paste to congeal, crust, or harden, to a minimum, thus I produce in this class of articles one of marked utility.

The gasket I employ is preferably made of sponge rubber, is materially thick and highly compressible and cushion-like, and when made of sponge rubber is provided with a rind at its periphery. The recovery qualities of such a gasket, when pressure is removed therefrom, are very great, and will continue to hold such recovery feature a maximum length of time, and even after extended usage, if this gasket should lose a considerable degree of its recovering qualities, it still would have and retain enough to make an air-tight closure.

The jar is formed of a body part which holds the mucilage or paste which is usually made of glass and is provided at its top with a series of screw threads moulded into the glass.

At the top of the jar I place a metal screw threaded rim which can be screwed and unscrewed from the screw threads of the body part and in this rim I hinge a lid capable of swinging thereon, which lid has a clip or tongue which engages with a lock on said screw rim part to lock it in position when closed and this clip can be raised to open the lid so as to swing up and down.

At the top peripheral edge of the metal rim I provide a shoulder or ledge and on the inner side a flange extends up from said shoulder or ledge, upon which I place the gasket herein referred to and a flanged edge or rim at the periphery of the lid impinges down upon this gasket when the jar is closed and forms an air-tight joint.

Figure 1:
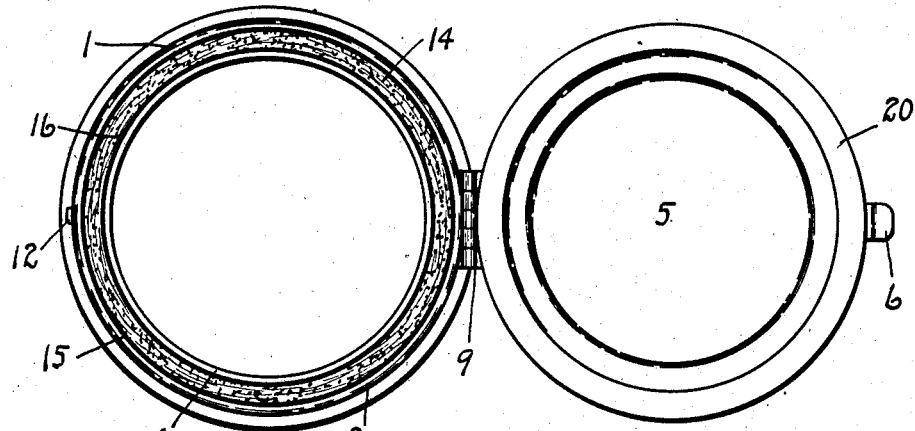
Figures 2, 3:
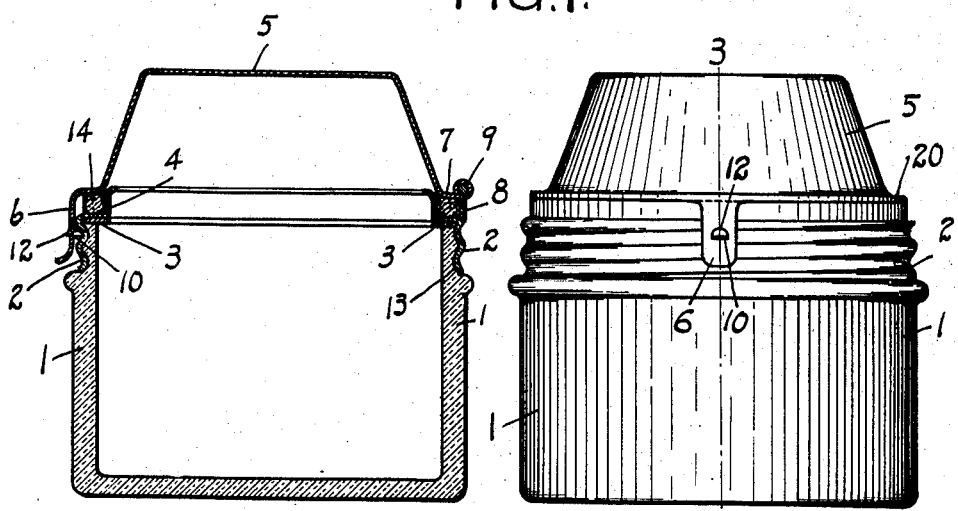
Figures 4, 5:
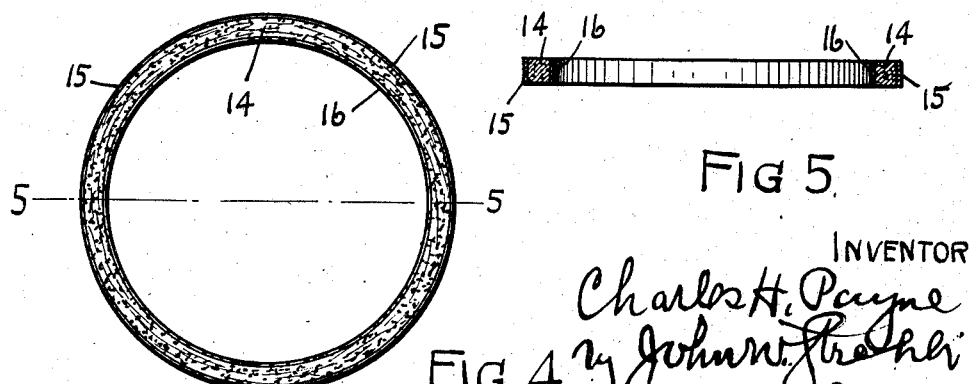

In the accompanying drawing, making a part of this specification:

Fig. 1 is a plan view of the top of the jar, and the lid or cover, the cover being open and extended, Fig. 2 is a view in elevation of the complete jar, Fig. 3 is a sectional view, taken on the line 3—3 of Fig. 2, Fig. 4 is a top view of the gasket, and Fig. 5 is a section thereof, taken on the line 5—5 of Fig. 4.

In this specification I will describe one form of jar which illustrates my invention in detail.

In the present instance, the jar body part is marked 1 and is usually made from glass or an equivalent material and preferably shaped as shown.

This body 1 holds the mucilage and is provided with a screw threaded rim at its top part, which engages screw threads at the mouth of the jar body, and generally made of metal, and is provided with a seat or shoulder and an upwardly extending rim 4 at the inner part of said seat 3. These parts are preferably made of one piece and integral.

I provide a cover or lid 5 having a clip tongue 6 preferably made integral therewith and also provided with a hinge part 7 also preferably integral therewith, the other hinge part 8 which forms the hinge being on the screw threaded rim 2, and preferably made integral therewith, a pin 9 holding said two hinged parts together to form the hinge, see Figs. 1 and 3.

The lid or cover 5 swings on this hinge. On the annular rim 2 I form a lug 10 as shown which is engaged by the clip point 12 on the tongle 6 when it is desired to have the top or cover in engagement with the body part. When it is desired to open the lid, the tongue 6 is engaged and lifted out of engagement with the lug.

In the present instance, the screw threaded rim 2 can be disengaged or engaged with the screw threads 13 at the top of the jar body, see Fig. 3, and in this manner said rim and top or cover can be disengaged or engaged with the body part 1.

The gasket 14 is generally formed like a ring or annulus and is placed upon the seat or ledge 3, abutting against the upwardly extending rim 4.

It will be noticed that this gasket is so formed that it has at its periphery a rind 15 and may have at its inner periphery a rind 16. The rind, is, of course, more dense than the body of the gasket. In the present instance, I preferably make this gasket of sponge rubber which is known to be spongelike and filled with small holes and interstices.

If I desire I may saturate this gasket with some material of a plastic or semi-plastic nature so as to make the gasket more serviceable, and rendering it capable of being absolutely air-tight,—for example I can saturate it with a material used for making certain printers' rolls.

The lid or top 5 is provided with a flaring rim 20 at its lower periphery, so that when the lid is closed, said rim will fit on and impinge against the gasket 14, and when the lid is closed and locked presses said gasket to an extent against the shoulder or seat and upturned rim plug, and said gasket being highly compressible and provided with a rind on the outside, it will readily be seen that an air tight joint is the result; it will further be seen that even after many repeated operations of this sort, the gasket will still retain its compressible and resilient cushion-like character and an air-tight joint will consequently always be formed.

It will be noted that this gasket is materially thick and heavy, making it highly yieldable for compressing purposes, and inasmuch as no air can get to the inside of the jar or to the contents therein, said contents will be maintained in a normal condition and not crust, congeal or harden only to a minimum degree.

It will be understood that I do not limit myself to any precise form of jar in connection with which I use a gasket as herein set forth, but may use the same in connection with any other kind of a jar, especially one in which the lid when closed compresses the said gasket.

I may form the gasket of any material other than herein described, which will attain the result herein set forth and which comes within this specification and claims.

What I claim as new and my invention and desire to secure by Letters Patent is:—

1. A receptacle including a body portion having an annular wall, a ring secured to the upper edge portion of the wall and having an inwardly extending annular shoulder and an upwardly extending annular flange, the shoulder and flange forming a rabbet, a packing ring located in the rabbet and engaging said ring, and an imperforate cap movably connected to the first mentioned ring and having an annular surface bearing upon the packing ring and rendering the receptacle air-tight.

2. A receptacle as claimed in claim 1, in which the first mentioned ring is removably secured to the body of the receptacle.

3. A receptacle as claimed in claim 1, in which the packing ring is formed of sponge rubber and is held in compressed condition by the cap.

4. A receptacle including a body portion having an annular wall provided near its upper edge with external threads, a threaded metallic ring engaging the threads of said body and having an inwardly extending annular shoulder and an upwardly extending annular flange, said shoulder and flange forming a rabbet, a packing ring of sponge rubber arranged in said rabbet, and an imperforate cap hinged to the first mentioned ring and having an annular surface engaging the packing ring for rendering the receptacle air-tight.

In testimony whereof, I affix my signature at Cincinnati, Ohio, this 5th day of December, 1925.

CHARLES H. PAYNE.